Figure 1:
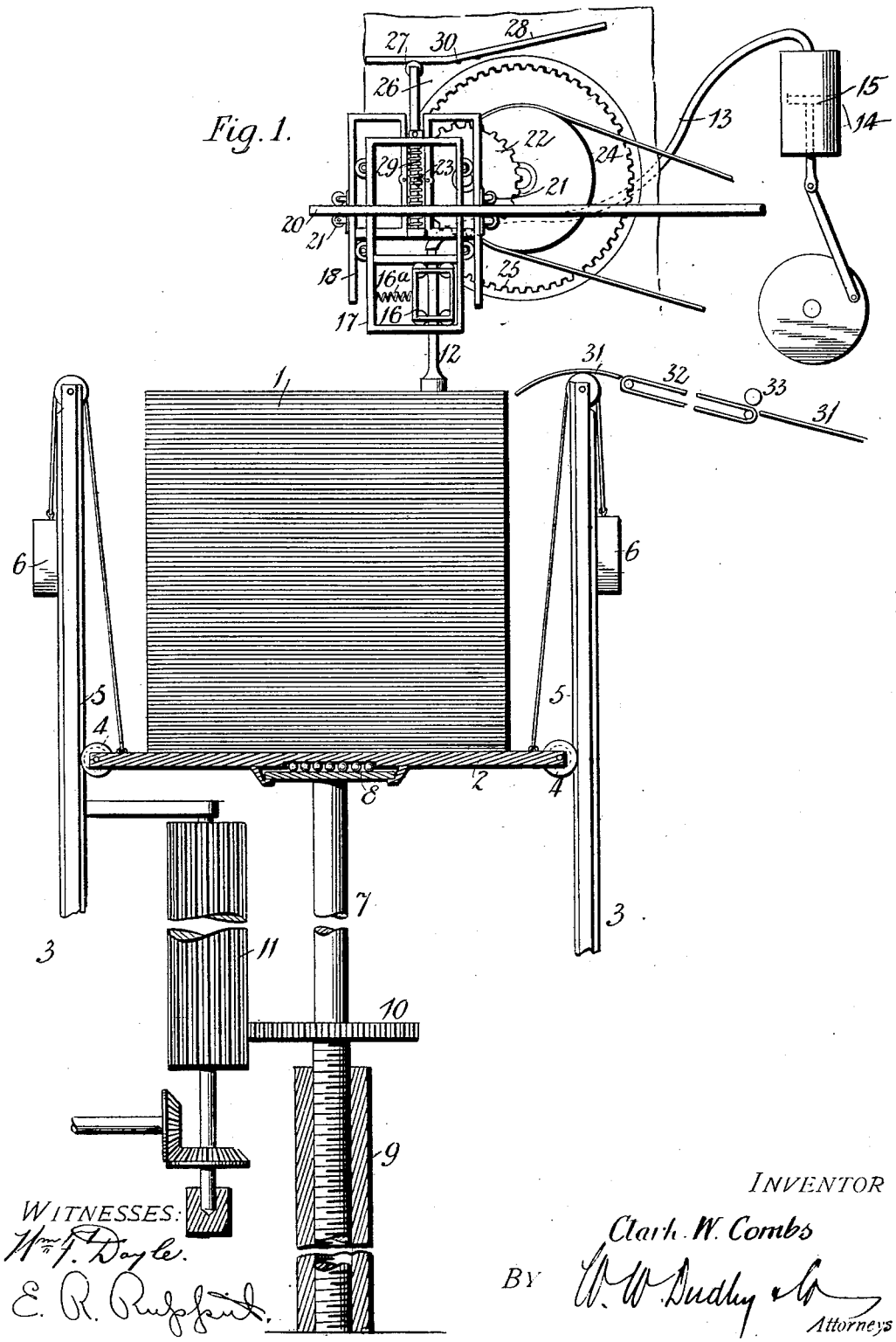

No. 677,062. Patented June 25, 1901.
C. W. COMBS.
SHEET SEPARATING, FEEDING, AND GUIDING APPLIANCE.
(Application filed Jan. 29, 1901.)

(No Model.) 6 Sheets—Sheet 1.

WITNESSES:
INVENTOR
Clark W. Combs
BY
Attorneys

No. 677,062. Patented June 25, 1901.
C. W. COMBS.
SHEET SEPARATING, FEEDING, AND GUIDING APPLIANCE.
(Application filed Jan. 29, 1901.)
(No Model.) 6 Sheets—Sheet 2.
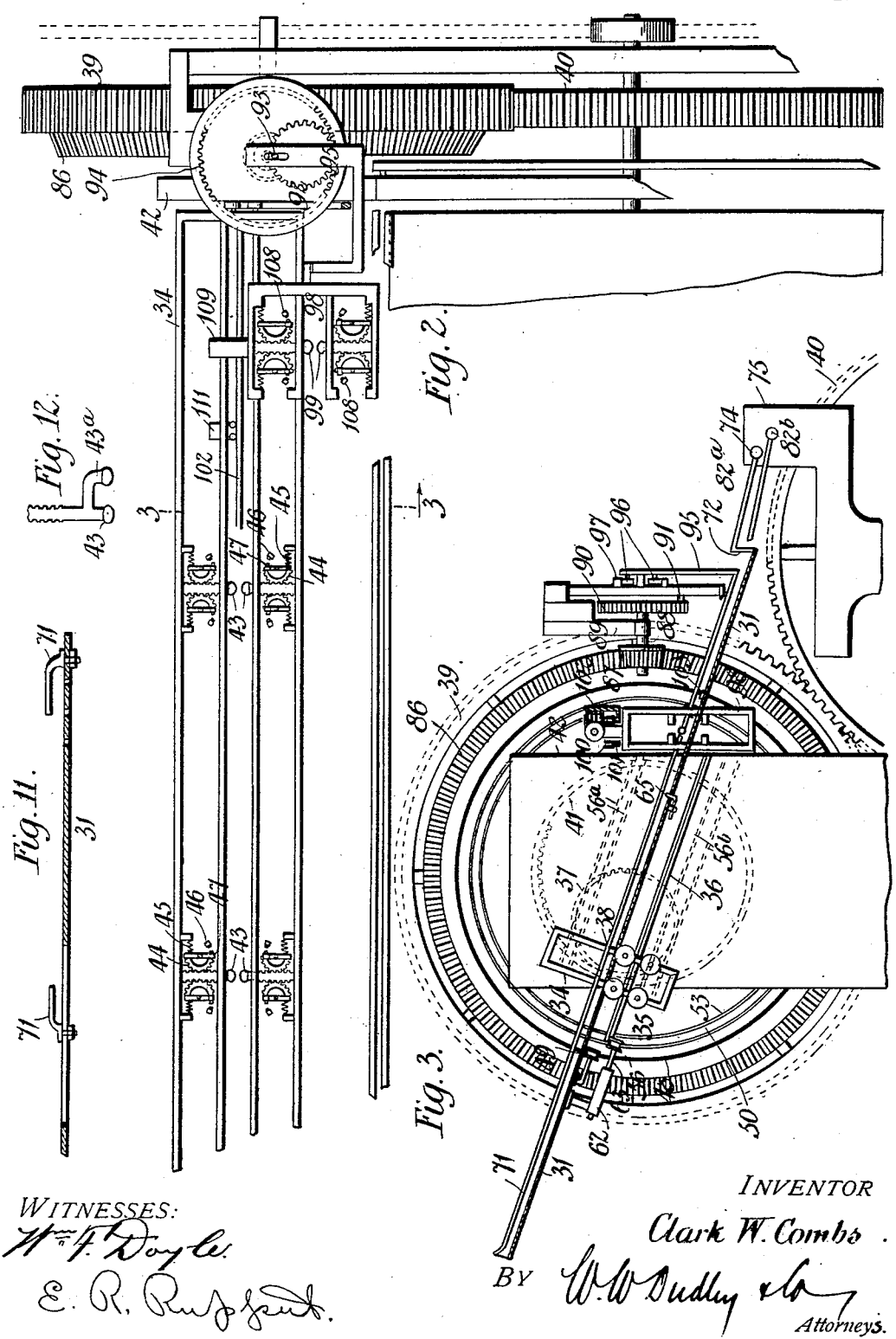
WITNESSES:
W. F. Doyle
E. R. Ruppert
INVENTOR
Clark W. Combs
BY W. W. Dudley & Co.
Attorneys.

No. 677,062. Patented June 25, 1901.
C. W. COMBS.
SHEET SEPARATING, FEEDING, AND GUIDING APPLIANCE.
(Application filed Jan. 29, 1901.)
(No Model.) 6 Sheets—Sheet 3.

WITNESSES:
Wm F. Doyle
E. R. Rupphant

INVENTOR
Clark W. Combs
BY W. W. Dudley & Co
Attorneys

No. 677,062. Patented June 25, 1901.
C. W. COMBS.
SHEET SEPARATING, FEEDING, AND GUIDING APPLIANCE.
(Application filed Jan. 29, 1901.)
(No Model.) 6 Sheets—Sheet 4.
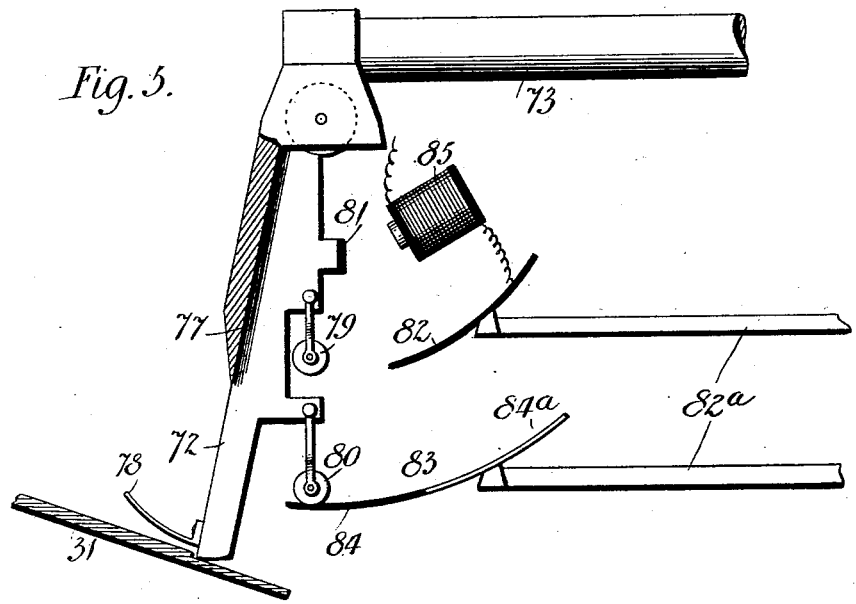
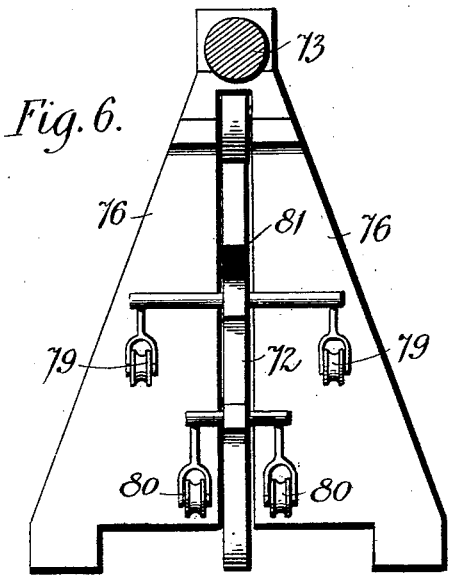
WITNESSES
Wm F. Doyle
E. R. Rushfut
INVENTOR
Clark W. Combs
BY W. W. Dudley & Co
Attorneys
THE NORRIS PETERS CO., PHOTO-LITHO., WASHINGTON, D. C.

No. 677,062. Patented June 25, 1901.
C. W. COMBS.
SHEET SEPARATING, FEEDING, AND GUIDING APPLIANCE.
(Application filed Jan. 29, 1901.)
(No Model.)
6 Sheets—Sheet 5.

WITNESSES:
Wm. F. Doyle
E. R. Ruppert

INVENTOR
Clark W. Combs
BY
W. W. Dudley
Attorneys

No. 677,062. Patented June 25, 1901.
C. W. COMBS.
SHEET SEPARATING, FEEDING, AND GUIDING APPLIANCE.
(Application filed Jan. 29, 1901.)
(No Model.) 6 Sheets—Sheet 6.
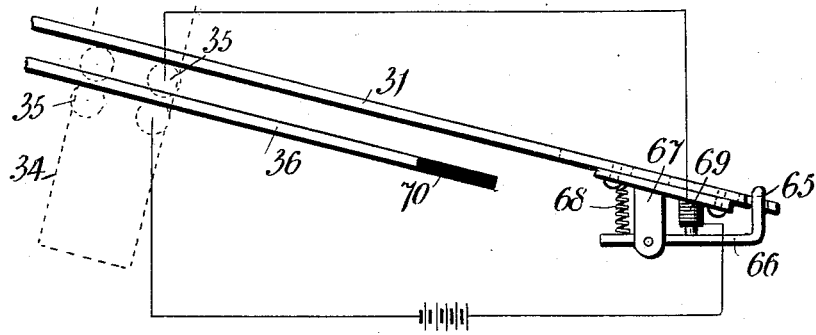
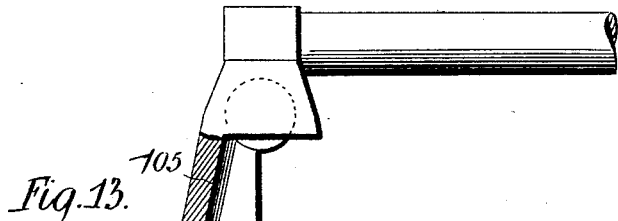
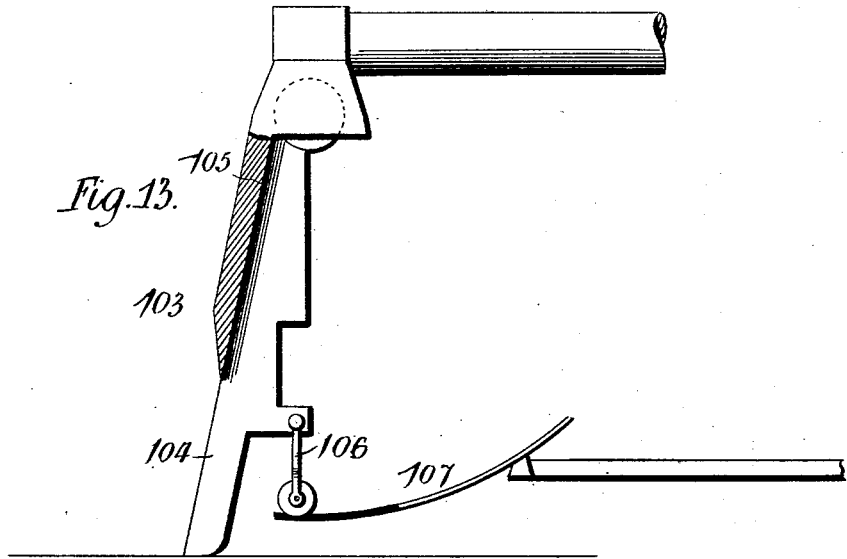
WITNESSES:
INVENTOR
Clark W. Combs
BY
Attorneys

UNITED STATES PATENT OFFICE.

CLARK W. COMBS, OF LEAVENWORTH, KANSAS.

SHEET SEPARATING, FEEDING, AND GUIDING APPLIANCE.

SPECIFICATION forming part of Letters Patent No. 677,062, dated June 25, 1901.

Application filed January 29, 1901. Serial No. 45,212. (No model.)

*To all whom it may concern:*

Be it known that I, CLARK W. COMBS, a citizen of the United States, residing at Leavenworth, in the county of Leavenworth and State of Kansas, have invented certain new and useful Improvements in Sheet Separating, Feeding, and Guiding Appliances; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to sheet separating, feeding, and guiding or registering appliances employed in connection with printing-presses and ruling, folding, and other machines, and contemplates a new and improved mechanism by the operation of which the sheets to be printed are separated and fed singly to the press properly guided or registered both at the front and side, all of the steps of separating, feeding, and guiding or registering being entirely automatically accomplished expeditiously and with great precision.

For an understanding of my invention reference is to be had to the following detailed description and to the accompanying drawings, in which—

Figure 4:
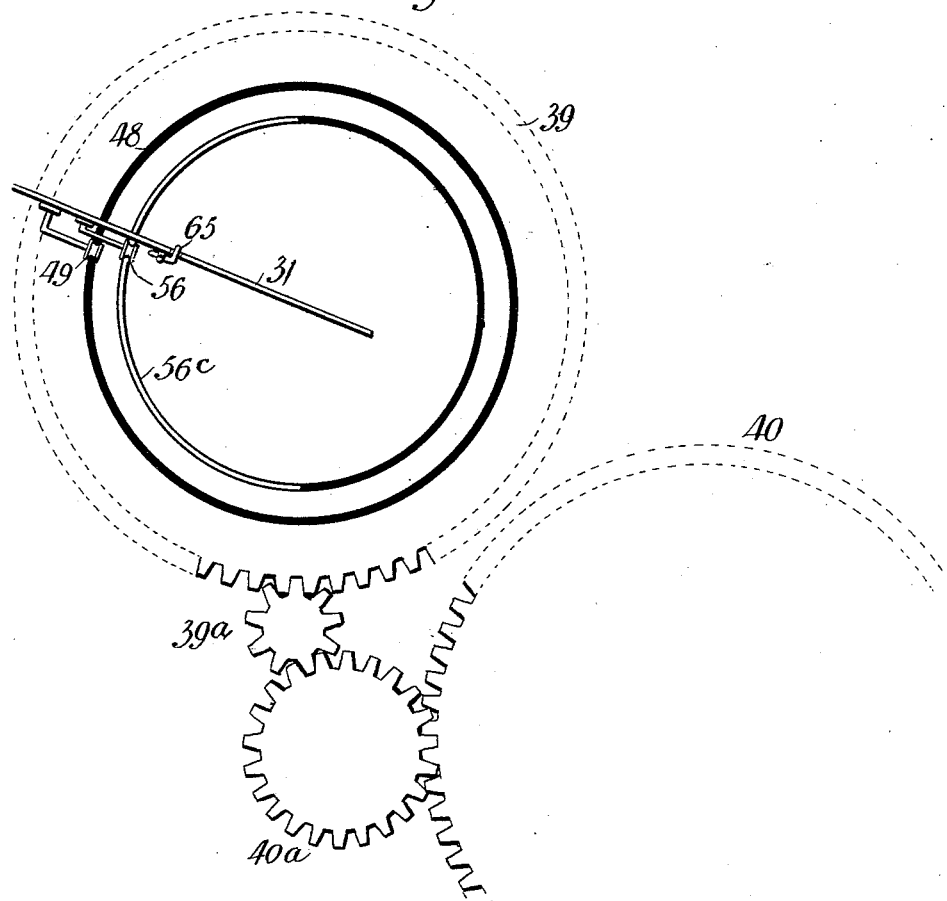
Figure 8:
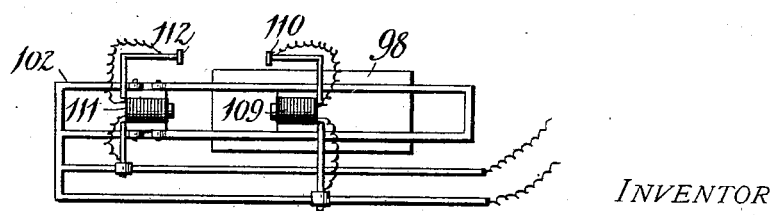
Figure 7:
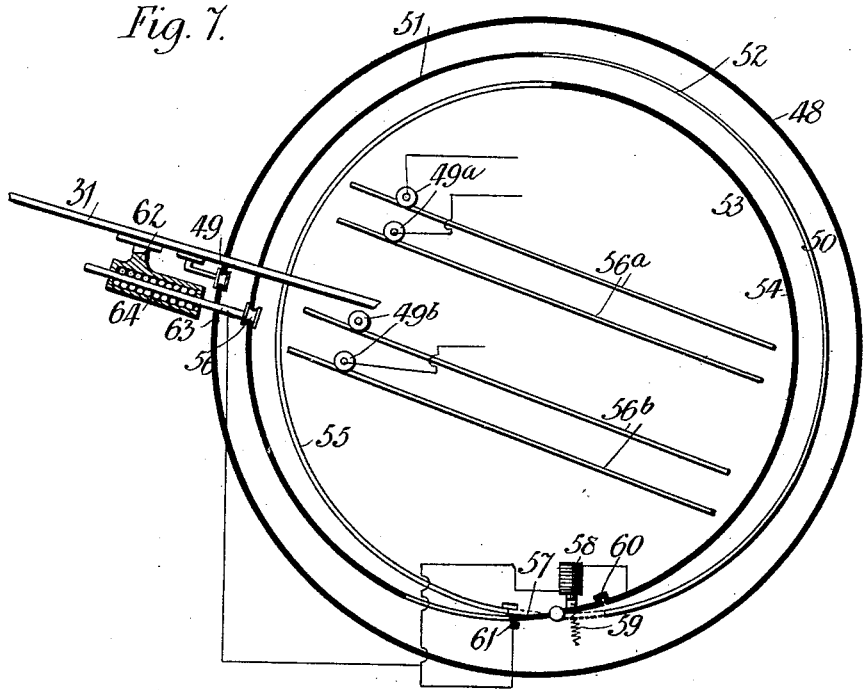
Figure 9:
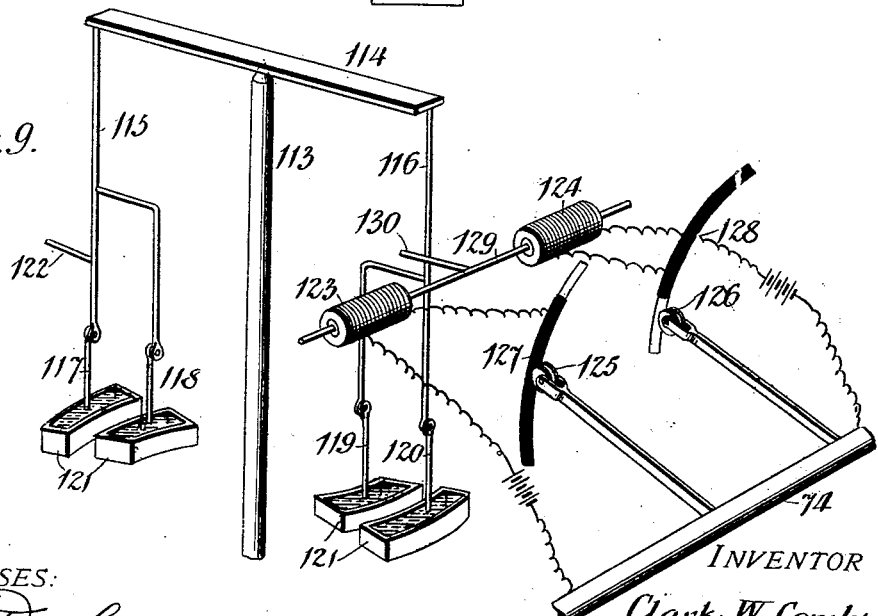

Figure 1 is a view in elevation, partly in section, of a new and improved pneumatic sheet-separating device which I prefer to employ in connection with my new and improved feeding mechanism. Fig. 2 is a front elevation, partly broken away, of a feeding mechanism embodying my invention. Fig. 3 is a vertical sectional view taken on line 3 3 of Fig. 2. Fig. 4 is a detail view showing another form of feeding mechanism. Figs. 5 and 6 are enlarged detail views of the front guide or register. Fig. 7 is an enlarged view of the trolley arrangement for controlling the gripping devices. Fig. 8 is a top view, enlarged, of the carrier for the side-guide feeding device. Fig. 9 is a view of a different form of front guide or register mechanism. Fig. 10 is an enlarged detail view of the sheet-stopping means and the controlling mechanism. Fig. 11 is a cross-sectional view of the table, showing the adjustable guide-strips for the sheet. Fig. 12 is a detail view of another form of gripper-finger. Fig. 13 is a detail view of the side guide or register.

Referring to the drawings by numerals, 1 denotes the stack of sheets to be separated and fed singly to the press, the stack being supported with the sheets horizontally disposed on a follower-plate 2, vertically movable in a frame 3. The plate is guided in its movement by the engagement of flanged wheels 4 thereon with vertical guides 5, fixed to the frame, and preferably the plate and sheets are counterbalanced by weights 6 or their equivalent. The stack is continuously or intermittently advanced by the movement of a follower-rod 7, which abuts at its upper end against the under side of the plate, where it is provided with a ball or roller thrust-bearing 8. The rod for a portion of its length is screw-threaded and engages a threaded sleeve 9, fixed to the frame. On the rod is keyed a gear-wheel 10, which meshes with an elongated driving-pinion 11, receiving motion through gear or other connection with a moving part of the press or other source of power. Rotation of the rod through the described gearing effects also its elevation by reason of the screw-bearing, and the stack is thus raised continuously or step by step, dependent upon the desired progression.

The sheets are separated and conveyed singly from the stack by suction devices 12, two or more of which are employed, and which are connected, preferably, by flexible tubes 13 with a cylinder 14, in which is a piston 15, reciprocated by suitable means, such as the crank-wheel and rod shown. The parts are timed in their movement to produce a suction in the devices 12 at the proper instant, and means are employed to convey the separated sheet as follows: The suction devices are each carried by a frame 16, mounted to have a horizontal movement in a frame 17, rollers or balls being employed to reduce friction. The frame 17 is in turn mounted to have a vertical movement in a third or main frame 18, rollers or balls also being employed to lessen the friction. The three frames, which for convenience I will term the "carrier," are together horizontally reciprocated and are supported on and guided by horizontal rails 20, which are engaged by flanged wheels 21 on the main frame. Reciprocating mechanism for the carrier is provided at each end thereof, the mechanism operating in unison, and inasmuch as these mechanisms are of similar structure a description of one of them will suffice.

22 denotes a crank-gear provided with a crank-pin 23, confined in a bearing formed therefor in the end of the main frame 18. The crank-gear is rotatably mounted on a drive-wheel 24, at one side of the center thereof, and the teeth of the crank-gear mesh with the teeth of an inside gear 25, fixed to the frame of the appliance concentrically with the drive-wheel. The drive-wheel receives motion through connection with a moving part of the press or other source of power, and in such motion the crank-gear is bodily rotated about the center of the drive-wheel and is rotated on its own axis through its engagement with the fixed inside gear. The effect of this double movement of the crank-gear is to impart to the crank-pin a reciprocatory transverse movement in substantially a straight horizontal line, which movement is transmitted to the carrier. The intermediate frame 17 carries a rod 26, having at its upper end a wheel or roller 27, which engages a fixed cam-rail 28. The frame 17 in the initial position of the carrier is depressed against the action of a spring 29 to bring the suction device into contact with the uppermost sheet by the engagement of the rod 26 with the lowest portion of the cam-rail, and in this position of the carrier the piston is actuated to cause the device to seize the sheet, the suction action being maintained throughout movement of the carrier. The frame 16 normally occupies a position to the right in the frame 17, a spring 16$^a$ of weak tension being employed to restore said frame 16 after movement to the stated position. This independent horizontal movement of the frame 16 is permitted in order to delay elevation of the suction device until the piston has been moved sufficiently to create the necessary suction and cause the sheet to be seized by the suction device prior to its elevation through the movement of the intermediate frame, which is accomplished gradually as the roller 27 of the rod 26 travels up the inclined portion of the cam-rail. At the proper point on the cam-rail are projections 30, which when engaged by the roller produce a sufficient jar to dislodge any sheets which may adhere to the uppermost sheet. The separated sheet is carried forwardly and upwardly, and when it reaches a predetermined point over the feeding-table 31 the piston is retracted, and the released sheet falls on a traveling apron 32, which forms a part of the table and which is moved by the rotation of one of its supporting-rollers.

33 denotes a feed-roller which contacts with the apron, and between which and the apron the sheet is conveyed. The table is adjustable to assume any desired angle, which may be greater or less than that shown.

The sheet is brought by the apron and feed-roller into position to be engaged by feeding mechanism and conveyed to the press-cylinder. The feeding mechanism consists of a reciprocated frame 34, which for convenience I will term the "carrier," and of sheet-gripping devices on the carrier separately actuated to insure the proper guiding or registering of the front of the sheet, the side of the sheet being guided or registered in a manner presently to be explained. The carrier-frame is supported in a position at a right angle to the table and is guided in its movement by the engagement of flanged wheels 35 thereon with a fixed track 36. The means for reciprocating the carrier is similar in construction and operation to the reciprocating means for the separating mechanism. Said means consists of a crank gear-wheel 37, provided with a crank-pin 38, confined in a slot bearing in the side of the carrier, the crank gear-wheel being pivoted on a gear-wheel 39 at one side of the center of the latter, and said wheel 39 meshes with a drive gear-wheel 40, operatively connected with a movable part of the press. The crank gear-wheel meshes with an inside gear 41, fixed to an upright 42, and in the rotation of the gear-wheel 39 the crank gear-wheel is bodily rotated and rotates on its own axis, thereby reciprocating the crank-pin, and with it the carrier. It will be understood that similar reciprocating means is employed at the opposite end of the frame.

The sheet-engaging devices on the carrier consist of gripper-fingers 43 43, arranged in pairs, and at least two pairs of fingers are employed to grip the sheet at two points. Each of the gripper-fingers may be provided with auxiliary fingers 43$^a$ to grip the sheet at other points, and thereby distribute the friction. The fingers are tipped with rubber or equivalent friction material. Said fingers are adjustable longitudinally along the carrier according to the size of the sheet. The lower fingers when in gripping position occupy slots in the table. The fingers of a pair are vertically movable to and from each other to grip and release the sheet, and each finger is moved by a pivoted toothed segment or segments 44, which engage teeth on the finger, the segment or segments being rotated to move the finger into gripping position against the action of a retracting-spring 45 by the attractive power of an electromagnet 46, a soft-iron piece, or preferably a companion electromagnet 47 being provided on the segment. The magnets 46 of each pair of gripper-fingers and the magnets 47, if employed, are electrically connected with circular tracks on the gear-wheel 39 and also with two trolley-wheels, constructed and arranged to operate as follows: The tracks are two in number, one of which, 48, is endless and is formed throughout of copper or other conducting material and is engaged by a trolley-wheel 49, supported from the frame of the appliance and connected in the circuit, while the other track is of double construction, the outer portion 50 being composed of a section 51 of conducting material and a section 52 of insulated material, while the inner portion 53 is similarly composed of conducting material 54 and insulated material 55, the sections being reversely disposed with reference to the sections of the outer portion 50. The inside track is engaged by a trolley-wheel 56. The sheet is fed forwardly either by a single movement or by two successive movements of the carrier. Where two successive movements of the sheet is desired, the double track is employed, the trolley-wheel traversing the outer section in the first reciprocation of the carrier and the inner section in the second reciprocation. To enable the trolley to shift from the inner to the outer section, and vice versa, a switch is employed, consisting of a short track or rail-piece 57, centrally pivoted to extend between the juxtaposed ends of the inner and outer tracks in one position and between the juxtaposed ends of the opposite outer and inner tracks in the other position. The switch is brought to one of its positions by the attractive power of an electromagnet 58, arranged in the circuit and energized at the proper time to throw the switch into line with the sections against the action of a spring 59, which spring when the magnet is deënergized moves the switch into line with the other track-sections. The switch is of conducting material and when attracted by the magnet engages contacts 60 61, also in the circuit, whereby the attracted position of the switch is maintained until it is traversed by the trolley-wheel. The trolley-wheel 56 for the inside track is mounted on a fixed support 62 to be capable of sidewise movement, whereby it is enabled to shift from one track to the other, the means employed being a trolley-arm 63, which carries at its outer end the trolley-wheel and is longitudinally movable in the support 62, balls 64 being employed to reduce friction.

The tracks 48 and 50 53 are continuously rotated and are maintained in circuit by any suitable means, such as spring or roller contacts. The finger-actuating magnets are connected in the circuit preferably by wheel-contacts 49ª 56ª, engaging contact-rails 49ᵇ 56ᵇ, arranged parallel to the movement of the carrier. In the forward movements of the carrier the trolley-wheel 56 engages the conducting-sections of the track 50 53 and establishes the circuit through the finger-magnets 46 47, with the result of bringing the fingers into gripping position. The sheet is thus carried forwardly at each forward movement of the carrier; but in the rearward movements of the latter the trolley-wheel is in engagement with the insulated sections of the track, and the circuit being broken the fingers are moved by their retracting-springs out of contact with the sheet, the latter remaining in its fed position during the rearward traverse of the carrier. Each pair of gripper-fingers is separately connected in a circuit with one of the front guide or register fingers presently to be described, the electric controlling mechanism above described being duplicated at the opposite side of the appliance to obtain the independent action of the pairs of fingers.

In the second movement of the sheet it is brought against the front guide or register, and in order to insure the proper extent of movement of the sheet in its second traverse I employ a temporary stop, which is engaged by the front edge of the sheet at the end of its first movement. This stop, which is adapted to be adjusted in position according to the size of the sheet, consists of a plurality of pins 65, each of which is secured to or forms an integral part of a lever 66, pivoted on a frame 67, the frame being bolted or otherwise secured to the under side of the table to be capable of the stated adjustment. The lever is rocked against the action of a spring 68 to bring the pin above the table to form the stop by the attractive power of an electromagnet 69, carried by the frame 67, the spring 68 operating to normally retract the lever and depress the pin out of the path of the paper. The magnet 69 may be energized by the employment of various means; but I prefer the construction shown, which consists of connecting upper and lower wheels 35 on the carrier in an independent circuit with the magnet 69 and employing a section of the track 36 as a conductor, the section numbered 70 being insulated from the other portion of the track, which is made non-conductive. The track section or contact 70 is so located that when the carrier, and consequently the sheet, approaches the end of the forward movement the wheels 35 engage the track-section 70 and establish a circuit through the magnet 69, with the result of energizing the latter and causing it to attract a soft-iron contact-piece on the lever. The movement of the lever elevates the pin above the table, and two or more such pins being provided an abutment is formed against which the front edge of the sheet is brought at the end of its first movement. By the employment of this temporary stop the sheet travels in its second movement the requisite distance to insure at the completion of such movement its proper engagement with the front guide and later its proper engagement by the gripping devices on the press-cylinder.

In Fig. 4 is shown means for feeding the sheet to the front guide by a single forward movement of the carrier. In this construction by the employment of reducing-gears 39ª 40ª between the gear-wheels 39 and 40 the speed of the wheel 39 is reduced to one-half of that of wheel 40, and the crank gear-wheel 37 and inside gear 41 are made proportionately larger to insure the feeding of the sheet the proper distance in the single movement of the carrier. In connection with the trolley-wheel 56 I employ a single circular track 56ᶜ, having an insulated portion and a conducting portion so arranged as to effect the separation of the gripper-fingers in the return movement of the carrier. In this construction also the stop-pins 65 are located in advance of the carrier, and in operation said pins determine the position of the front edge of the wheel previous to its being gripped and fed, it being understood that the sheet is brought against the stop-pins by the action of the apron 32.

In order to overcome the tendency of the sheets to curve or curl at their front edges, I provide at each side of the table a guide-strip 71, extending, preferably, the whole length of the table and which projects on the side edge of the sheet the proper distance to insure the feeding of the sheet in a flat condition. By this means the front edge of the sheet is properly presented both to the temporary stop and the front guide. The guide-strips, which at their forward ends are upwardly inclined to properly deflect the sheet, are adjustably secured to the table in order to accommodate sheets of different sizes.

The sheet is guided or registered at its side by mechanism the construction and operation of which will presently be described.

Near the end of its second movement the sheet is brought against the front guide or register, which occupies a position above the press-cylinder similar to that of the guide of the usual construction. The front guide or register consists of a plurality of guide-fingers 72, each depending from the outer end of an arm 73, carried by a shaft 74, the shaft being journaled in brackets 75 and operatively connected with a moving part of the press to elevate the guide-fingers at the proper time to permit the sheet when gripped to the cylinder to move freely. Each of the guide-fingers is, as before stated, in circuit with one of the pairs of gripper-fingers. The guide-fingers are each flanked by plates 76, secured to the outer end of the arm 73. The finger is pivoted to the plates in a manner to insure the minimum of friction, and the finger is made of aluminium or other very light material in order that it may be readily moved by the advancing sheet. The finger has a preponderance of weight at its inner side, and in its normal position it inclines in the direction of the sheet, a stop 77 on the plates 76 limiting its outward movement. When near the end of its second movement, the sheet engages the free lower end of the finger and moves it rearwardly, and in order to prevent the front edge of the paper during movement from bending the plates are provided with a projection 78, operating similarly to the guide-strips 71. At its rear side the guide-finger carries two loosely-hung pairs of roller or other contacts 79 80 and a soft-iron contact-piece 81. In the path of the contacts 79 are curved tracks 82, of conducting material, and 83 denotes similarly-curved tracks, each having a section 84 of conducting material and an insulated section 84$^a$, which latter may be out of the paths of the contacts. The tracks 82 83 are supported on an arm 82$^a$, which extends outwardly from a rod 82$^b$, mounted in the brackets 75, to be capable of movement to adjust the tracks with reference to the contacts 79 and 80. The contacts 80 are normally in contact with the track-sections 84, and said sections and contacts are connected in each circuit with the magnets which control each pair of gripper-fingers. When the guide-finger which is impelled by the advancing sheet nears the end of its inward movement, the contacts 80 are carried out of engagement with the conducting-sections 84, with the result of breaking the circuit and deënergizing the magnets controlling the gripper-fingers. The sheet is thus released when it reaches the proper position to be seized by the grippers on the cylinder, and immediately thereafter the side-register mechanism, presently to be described, is operated to guide the side of the sheet, after which the front-guide fingers are elevated and the sheet is gripped to the cylinder.

The contacts 79 on the guide-finger are normally out of contact with the tracks 82, but are brought into engagement therewith in the inward movement of the finger. In the path of the contact-piece 81 is an electromagnet 85, supported on the arm 82$^a$ and electically connected with the contacts 79 and 81 and the tracks 82, and in this circuit is the controlling mechanism for the side guide or register, which will now be described.

Meshing with a circular series of bevel gear-teeth 86 on the inner face of the wheel 39 is a bevel-pinion 87, fixed to a short shaft 88, journaled in a frame-piece 89. Keyed to the shaft 88 is a wheel 90, provided at one side of its center with a pin 91, on which is journaled a crank-gear 92, having a crank-pin 93. This crank-gear meshes with a fixed inside gear 94. The crank-pin occupies a bearing-slot in a bracket 95, which is guided and held in a vertical position by the engagement of pinions 96 thereon with upper and lower rack-bars 97. It will be understood that in the rotation of the crank-gear the bracket 95 is reciprocated similarly to the sheet-carrier hereinbefore described. The bracket 95 extends under and forwardly of its reciprocating means and is secured to a transverse carrier 98, equipped with gripping-fingers 99 and controlling means similar to that employed in connection with the gripping-fingers hereinbefore described. The transverse or side-guide carrier is supported from above by the engagement of flanged wheels 100 thereon with tracks 101 on an adjustable frame 102, and said carrier is reciprocated with the bracket 95.

Each of the fingers of the side-guide carrier is provided with two gripping extremities adapted to clamp the sheet at two points and draw it against a side guide or register 103, the construction and operation of which are similar to the front guide. The side finger 104, which is pivoted to flanking plates 105, carries a pair of loosely-hung roller-contacts 106, which in the rearward movement of the finger roll along tracks 107, having a conducting and an insulated section, and said contacts and tracks are connected in circuit with the magnets 108, which control the gripper-fingers 99 in a manner to effect the release of the sheet when the finger 104 has moved sufficiently and the side of the sheet has been properly registered.

The means for energizing the magnets to bring the gripper-fingers into clamping position against the action of the retracting-springs consists of two magnets, one of which, 109, is fixedly mounted on the side-guide carrier and is provided with a yielding contact-piece 110, located slightly in advance of the forward end of the magnet, and the other of which, 111, is mounted to slide along tracks on the top of the frame 102 and carries a yielding contact-piece 112, extending slightly in advance of the front end of said magnet. These magnets 109 111 and contacts 110 112 are arranged in circuit with the magnet 85, contact 81, contacts 79, and tracks 82 of each front guide. The reciprocation of the side-guide carrier is constant, and previous to the establishment of the circuit in which they are arranged the side-guide fingers remain inactive. As the front-guide fingers are moved inwardly a circuit is established through the parts 85, 81, 79, and 82 and also through the devices which control the side-guide gripper-fingers. This circuit is, however, not complete until the contacts 110 and 112 are brought by the movement of the magnet 109 into engagement. Then a complete circuit is established and the energized magnets 109 and 111 are attracted to each other and travel together. The formation of this complete circuit causes the side-guide fingers to move into gripping position to clamp the sheet and move it against the side-guide finger. This movement continues until the finger has reached its innermost position, when the circuit is broken and the sheet is released properly guided both at the front and side. The elevation of the front-guide fingers, which is accomplished at regular intervals, restores said fingers and the contact carried thereby to their normal positions.

In Fig. 9 I have shown another means employed in connection with the guide-fingers for controlling the gripper-fingers. 113 denotes a post, which is adjustably supported at the outer end of the arm 82ª, on the upper end of which is balanced a rod 114. From the ends of this rod depend arms 115 116, each of which carries two flexibly-connected contact-points, the points being numbered 117, 118, 119, and 120. Each of the four points enters a body of mercury contained in a pan 121, adjustably positioned, and in the horizontal movement of the balanced rod the points are drawn through the mercury and maintain the circuit, the circuit being broken when the points have moved sufficiently to pass therefrom. The rod 114 and arms 115 116 are swung by the engagement of projection 122 on one of the arms by the guide-finger. I employ the following means for restoring the normal position of the rod and arms: 123 124 denote solenoids, each of which is in circuit with contacts controlled by the movement of the guide-finger-supporting shaft or rod 74. Said shaft or rod carries two roller-contacts 125 126, and in the paths of said contacts are curved tracks 127 128. These tracks have conducting and insulated sections, the sections of one track being the reverse of those of the other. A separate circuit is provided for each solenoid and its contacts. 129 is a rod the ends of which enter the solenoids 123 124, and between its ends the rod carries a projection 130, extending into the path of one of the arms 115 or 116. When the guide-finger is in its lowered position, the solenoid 123 is energized by the engagement of contacts 125 127, and the rod is moved to bring the projection 130 a predetermined distance from the arm 115 or 116, and said arms are therefore free to be moved by the guide-finger. When the guide-finger is raised, the solenoid 123 is deënergized and the solenoid 124 is energized to draw the rod in the opposite direction and through the projection 130 to restore the rod and arms to their normal position. The points 117 and 118, with their respective bodies of mercury, are in circuit with the magnets of the gripper-fingers 43, while the points 119 and 120 and their bodies of mercury are in circuit with the magnets which control the action of the gripper-fingers of the side guide or register device. The mercury-containing pans are adjustable on their support to bring them in proper position to actuate the parts which they control at the proper time.

I claim as my invention—

1. In an appliance of the class specified, the combination of means for separating the sheets and feeding them singly, of a reciprocatory carrier, a gripping device thereon electrically controlled to grip the sheet in the forward movement of the carrier to move the sheet, and means for guiding or registering the sheet at the end of its movement, said means being connected in electrical circuit with the gripping-device-controlling mechanism and adapted to be actuated by the sheet to break the circuit and release the sheet from the gripping device.

2. In an appliance of the class specified, the combination of a reciprocatory carrier, a gripping device thereon electrically controlled to grip the sheet in the forward movement of the carrier to move the sheet, and means for guiding or registering the sheet at the end of its movement, said means being connected in electrical circuit with the gripping-device-controlling mechanism and adapted to be actuated by the sheet to break the circuit and release the sheet from the gripping device.

3. In an appliance of the class specified, the combination of a reciprocatory carrier, a gripping device thereon electrically controlled to grip the sheet in the forward movement of the carrier, means for guiding or registering the front of the sheet electrically connected with the gripping device and actuated by the advancing sheet to break the circuit and release the sheet, and electrically-controlled means for guiding or registering the side of the sheet adapted to be set in operation by the movement of the front guiding or registering means.

4. In an appliance of the class specified, the combination of a reciprocatory carrier, sheet-gripping fingers on the carrier, electromagnets operating to move the fingers into gripping position, and electrical controlling means for said magnets.

5. In an appliance of the class specified, the combination of a reciprocatory carrier, spring-retained sheet-gripping fingers on the carrier, electromagnets operating to move the fingers into gripping position against the action of the springs, and electrical controlling means for said magnets.

6. In an appliance of the class specified, the combination of a reciprocatory carrier, sheet-gripping fingers on the carrier, electrically-controlled means for moving the fingers into gripping position, circular contact rails or tracks carried by a rotatable part of the appliance one of the rails having an insulated section, and a trolley in contact with each track, the trolleys and tracks being electrically connected with the finger-controlling means.

7. In an appliance of the class specified, the combination of a reciprocatory carrier, sheet-gripping devices on the carrier, electrically-controlled means for moving the devices into gripping position in the forward movements of the carrier, circular contact rails or tracks carried by a rotatable part of the appliance one of the rails being double and having an electrically-controlled switch and provided with insulated sections, and a trolley in contact with each rail, the trolleys and rails being electrically connected with the device-controlling means.

8. In an appliance of the class specified, the combination of a carrier, of means for reciprocating the carrier consisting of a gear-wheel having a crank-pin journaled on the carrier, a drive-wheel on which the gear-wheel is eccentrically mounted, and an inside gear-wheel engaged by the aforesaid gear-wheel and fixed to the frame of the appliance concentrically with the drive-wheel.

9. In an appliance of the class specified, the combination of an inclined table over which the sheets travel, a guide-track parallel to the table, a carrier provided with flanged wheels engaging the track, mechanism for reciprocating the carrier, sheet-gripping devices on the carrier, and means for actuating said devices.

10. In an appliance of the class specified, the combination of a table over which the sheets travel, a carrier, means for reciprocating the carrier, gripping devices on the carrier adapted to grip the sheet in the forward movement of the carrier, a temporary stop for the sheet, and electrical means controlled by the movement of the carrier for moving said stop into the path of the sheet.

11. In an appliance of the class specified, the combination of a table, a carrier, means for reciprocating the carrier, gripping devices on the carrier adapted to grip the sheet in the forward movement of the carrier, a temporary stop consisting of a plurality of pins adjustable in position, and electromagnets electrically connected with contacts on the carrier and frame operating at the end of movement of the carrier to move the pins above the table into the path of the sheet.

12. In an appliance of the class specified, the combination of a movable support for the stack of sheets, a suction device mounted to have a horizontal movement in a spring-controlled vertically-movable frame, and a reciprocable frame in which the aforesaid frame is mounted.

13. In an appliance of the class specified, the combination of a movable support for the stack of sheets, a suction device mounted on a spring-controlled frame, a cam-rail, a roller carried by the frame in engagement with the rail to effect the vertical movement of the frame, and a reciprocable frame in which the aforesaid frame is mounted.

14. In an appliance of the class specified, the combination of a suction device mounted on a spring-controlled frame, a reciprocable frame in which the aforesaid frame is mounted, an inclined rail having projections, and a roller carried by the spring-controlled frame engaging the rail to effect the vertical movement of the suction device.

15. In an appliance of the class specified, the combination of sheet-feeding mechanism, a front guide or register finger adapted to be moved by the advancing sheet, side guiding or registering means and electrical connections operating when the finger has been moved to actuate the side guiding or registering means.

16. In an appliance of the class specified, the combination of sheet gripping and feeding devices electrically controlled, and a pivoted front guide or register carrying contacts movable in the paths of other contacts connected with the gripping devices, said guide or register adapted when moved by the advancing sheet to effect the breaking of the circuit to release the sheet.

17. In an appliance of the class specified, the combination of sheet-gripping and forward-feeding devices electrically controlled, a front guide or register adapted when moved by the advancing sheet to cut out the gripping devices and release the sheet, electrically-controlled means for gripping and feeding the sheet sidewise adapted to be set in motion by the movement of the front guide or register, and a side guide or register adapted when moved by the sheet to cut out the side-gripping means and release the sheet.

18. In an apparatus of the class specified, the combination of a carrier, means for reciprocating the same, gripping devices on the carrier, electrical means for moving the devices into gripping position, an electromagnet on the carrier, having a contact, and an electromagnet movable on the carrier-supporting frame having a contact and means for establishing a circuit whereby upon engagement of the contacts the magnets will be energized and will move together and will complete the circuit through the gripping-device-operating means.

19. In an appliance of the class specified, the combination of a pivoted guide or register finger, a balanced rod, arms depending from the rod carrying hinged contact-points, mercury-pans in the paths of the points, a projection on one of the arms in the path of the finger, a stop-rod in the path of one of the arms, solenoids for moving the stop-rod, and separate means for electrically controlling each solenoid.

20. In an appliance of the class specified, the combination of a balanced rod, arms depending from the rod carrying contacts, mercury-pans adjustable in the paths of the contacts, a projection on one of the arms arranged in the path of the sheet, and means for retracting the rod and arms.

In testimony whereof I affix my signature in presence of two witnesses.

CLARK W. COMBS.

Witnesses:
W. T. NORTON,
A. BROWNING.